(12) United States Patent
Tomita

(10) Patent No.: US 6,283,184 B1
(45) Date of Patent: *Sep. 4, 2001

(54) PNEUMATIC TIRE INCLUDING SIPES

(75) Inventor: Arata Tomita, Tokyo (JP)

(73) Assignee: Bridgestone Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,642

(22) Filed: Mar. 17, 1998

(30) Foreign Application Priority Data

Mar. 18, 1997 (JP) .................................................. 9-064928

(51) Int. Cl.$^7$ ...................................................... B60C 11/12
(52) U.S. Cl. .................................. 152/209.18; 152/DIG. 3
(58) Field of Search ................................ 152/209.1, 209.2, 152/209.3, 209.18, 209.28, DIG. 3, 209.11

(56) References Cited

U.S. PATENT DOCUMENTS

| | | | |
|---|---|---|---|
| 2,770,279 | * 11/1956 | Harrison | 152/DIG. 3 |
| 3,730,245 | * 5/1973 | Kusunoki et al. | 152/209.11 |
| 4,364,426 | * 12/1982 | Mills et al. | 152/209.11 |
| 5,176,766 | * 1/1993 | Landers et al. | |
| 5,209,793 | * 5/1993 | Cusimano | 152/209.2 |
| 5,211,779 | * 5/1993 | Tomioka et al. | |
| 5,407,005 | * 4/1995 | Consolacion et al. | |
| 5,421,389 | * 6/1995 | Favre et al. | |
| 5,431,208 | * 7/1995 | Aoki et al. | 152/DIG. 3 |

FOREIGN PATENT DOCUMENTS

| | | | |
|---|---|---|---|
| 391300 | * 10/1990 | (EP) | . |
| 485884 | * 5/1992 | (EP) | . |
| 62-152906 | * 7/1987 | (JP) | . |
| 1-106704 | * 4/1989 | (JP) | . |
| 02 024204 | 1/1990 | (JP) | . |
| 2-24204 | 1/1990 | (JP) | . |
| 03 014704 | 1/1991 | (JP) | . |
| 3-38410 | * 2/1991 | (JP) | . |
| 3-139404 | * 6/1991 | (JP) | . |
| 07 228106 | 8/1995 | (JP) | . |

* cited by examiner

Primary Examiner—Steven D. Maki
(74) Attorney, Agent, or Firm—Sughrue, Mion, Zinn, Macpeak & Seas, PLLC

(57) ABSTRACT

A pneumatic tire in which a sipe, which is substantially parallel to a contour line of a trailing edge of a ground-contact configuration, is formed in a trailing edge region of each block at shoulder sides of the pneumatic tire. From a time of step-in to a time of kick-out of a block, the effect of shearing strain which is transmitted to a trailing edge from a preceding trailing edge portion is mitigated, and movement of the trailing edge of the block with respect to a road surface is suppressed. Accordingly, wear at the trailing edge of the block, i.e., heel-and-toe wear, is suppressed, and noise caused by heel-and-toe wear is reduced.

6 Claims, 8 Drawing Sheets

PNEUMATIC TIRE INCLUDING SIPES

BACKGROUND OF THE INVENTION

1. Field of the Invention

The present invention relates to a pneumatic tire having at the tread thereof blocks in which sipes are formed, and in particular, to a pneumatic tire in which irregular wear is suppressed and noise at the time of wear is decreased.

2. Description of the Related Art

Generally, in pneumatic tires provided with block patterns, irregular wear known as heel-and-toe wear, results in steps due to wear at the leading (step-in) edges and the trailing (kick-out) edges of blocks, and tends to occur. Such wear is accompanied by a deterioration in external appearance and noise, and there is a definite need to solve this drawback.

With heel-and-toe wear a step is formed due to earlier wear at the toe side which is the trailing edge, than at the heel side which is the leading edge.

An example of a method for improving heel-and-toe wear is a method in which the angle of the groove wall surfaces with respect to a normal line which is orthogonal to the direction in which the groove extends, is changed at the leading edge and the trailing edge.

However, it is difficult to greatly change the angle of the groove wall surfaces due to problems such as removing the tire from a mold at the time of vulcanization or the like. Further, as wear progresses, the width of the groove has a distribution which differs greatly than that at the time the tire was new, which is not preferable from the standpoint of performance nor from the standpoint of external appearance Further, as can be seen from Japanese Patent Application Laid-Open (JP-A) No. 2-24204, an idea has been proposed in which sipes are disposed parallel to the contour line at the leading edge of the ground-contact configuration. However, this structure can only be applied to patterns having a specific orientation, and is not practical.

SUMMARY OF THE INVENTION

In view of the aforementioned, an object of the present invention is to provide a pneumatic tire in which heel-and-toe wear is suppressed and the noise due to the heel-and-toe wear which is generated is reduced.

Generally, blocks at the shoulder sides of a pneumatic tire are displaced toward the center at the time of step-in, and thereafter, contact the road surface, and at the time of kick-out, return while sliding toward the outer sides, such that wear is generated at these times.

The magnitude of the irregular wear is affected by the magnitude of the shearing strain between the region which first returns (the kicked-out region) and the region which is still contacting the road surface.

In a block pattern, due to the shearing strain between a leading edge (heel side) which is a preceding trailing edge region and a trailing edge (toe side) which is a following trailing edge region, the amount of wear of the trailing edge (the following trailing edge region) is greater than the amount of wear of the leading edge (the preceding trailing edge region), and thus heel-and-toe wear is generated.

As the result of various intensive experimental studies, the present inventors found that in order to mitigate the effect of the shearing strain from the preceding trailing edge region, it is effective to utilize sipes matching the ground-contact configuration at the time of kick-out, i.e., in order to mitigate the affect of the shearing strain from the leading edge side, it is effective to use a sipe at the trailing edge side.

Further, it is known that when heel-and-toe wear is generated at shoulder side blocks, the noise generated at the time the blocks contact the ground becomes large.

In order to determine the cause behind this phenomenon, the force which the ground-contact surface receives from the road surface and the ground-contact configuration were observed in detail, and the following was learned.

As heel-and-toe wear is generated, the force received from the road surface increases at the leading edges of the blocks at the shoulder portions. This is because, due to the heel-and-toe wear generated at the shoulder portions, at the time of step-in of the next block, the trailing edge side of the block of the previous pitch (the block which has already been stepped into) becomes a stepped concave portion. Therefore, the load of the block of the previous pitch is reduced, or in some cases, a region which does not contact the ground arises. This effect increases the ground-contact pressure of the leading edge of the block of the next pitch, and the striking noise at the time of stepping into the block increases.

Accordingly, in order to suppress the increase in ground-contact pressure at the leading edge, it is effective to reduce the stepped concave portion itself and simultaneously to divide the stepped concave portion to diminish the effect on the next pitch.

As a result of various experimental studies, the present inventors learned that the amount of the step due to heel-and-toe wear of an entire block could be effectively suppressed by forming, at the trailing edge side, a sipe conforming to the ground-contact configuration at the time of kick-out.

A first aspect of the present invention is a pneumatic tire having a tread pattern including a plurality of blocks defined by a plurality of circumferential direction grooves extending substantially along a tire circumferential direction and a plurality of transverse direction grooves extending substantially along a tire transverse direction, wherein a sipe, which is substantially parallel to a contour line at a trailing edge of a ground-contact configuration, is formed in a region at a trailing edge of each of blocks at shoulder sides of said pneumatic tire among the plurality of blocks.

The term, "ground-contact configuration" as used herein is defined as follows. In accordance with the 1996 JATMA Year Book ("JATMA" stands for the "Japan Automobile Tire Manufacturers' Association, Inc."), a tire is rim-assembled to a standard rim at an applied size, and the tire is filled with air pressure corresponding to the maximum load capacity at the applied size/ply rating in accordance with the 1996 JATMA Year Book. The ground-contact configuration is measured when there is a load of 80% of the maximum load capacity at the applied size/ply rating in accordance with the 1996 JATMA Year Book (when there is both description of a single tire and plural tires, the description of the single tire is applicable).

In the pneumatic tire of the first aspect of the present invention, a sipe which is substantially parallel to the contour line at the trailing edge of the ground-contact configuration is provided in a region at the trailing edge of each block at the shoulder side. Therefore, from the time of step-in to the time of kick-out of a block, the effect of the shearing strain transmitted to the trailing edge from the preceding trailing edge region is mitigated, the movement of the trailing edge with respect to the road surface is suppressed, and wear at the trailing edge (the toe side), i.e., heel-and-toe wear, is suppressed.

Instead of heel-and-toe wear (i.e., instead of a large concave portion being formed), minute concave portions are formed in vicinities of the front and rear of the sipe and at the trailing edge of the block. The effect of the stepped concave portion on the surroundings is proportional to the surface area of the region, and is inversely proportional to the distance from the concave portion.

Accordingly, by providing a sipe as described above and by reducing and dividing the stepped concave portion, the degree of increase in the ground-contact pressure of the leading edge of the block of the next pitch is decreased, and the striking noise at the time of step-in of the block can be decreased.

By setting the sipe disposed at the trailing edge region substantially parallel to the contour line at the trailing edge, the effect of the shearing strain from the preceding trailing edge region can be effectively mitigated.

In accordance with a second aspect of the present invention, there is provided a pneumatic tire in which a sipe, which is substantially parallel to the contour line of the leading edge of the ground-contact configuration, is provided at a leading edge region of each block at the shoulder side.

The smaller the compressive rigidity of the leading edge, the more the rate of increase in the ground-contact pressure can be decreased. Accordingly, by providing a sipe, which is substantially parallel to the contour line at the leading edge of the ground-contact configuration, at the leading edge region, the tread rubber deforms easily and the compressive rigidity can be decreased at the leading edge side. Therefore, the striking noise at the time of step-in of the block can be decreased.

DESCRIPTION OF THE PREFERRED EMBODIMENTS

First Embodiment

A first embodiment of a pneumatic tire of the present invention will be described hereinafter in accordance with FIGS. 1 and 2.

Figure 1:
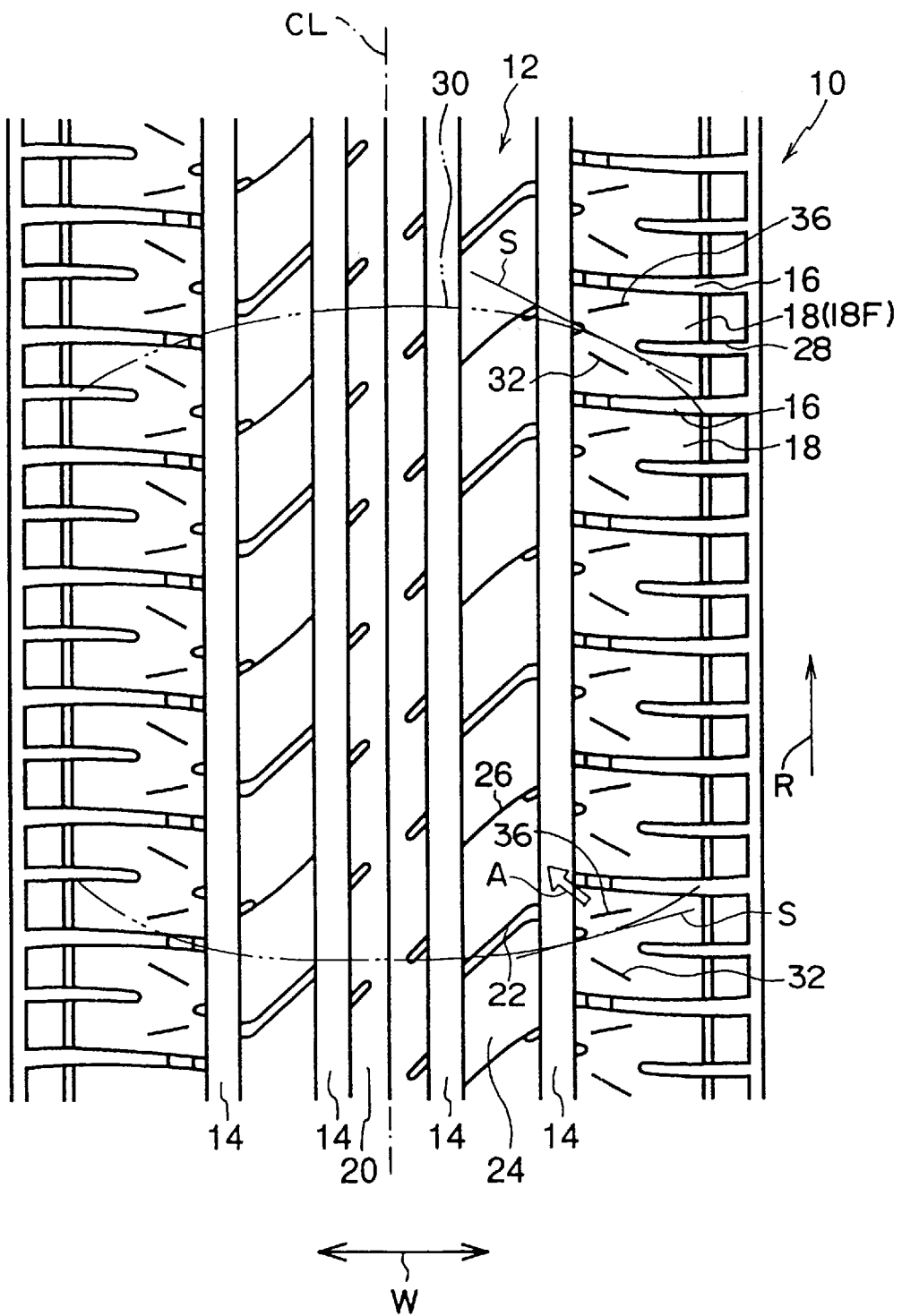
FIG. 1 is a plan view of a tread of a pneumatic tire relating to a first embodiment of the present invention.

As illustrated in FIG. 1, four circumferential direction main grooves 14, which extend along the circumferential direction of the tire (the direction of arrow R and the direction opposite to the primary direction of arrow R, the direction of arrow R representing the direction of rotation of the tire), are formed in a tread 12 of a pneumatic tire 10 of the present first embodiment. At the tire transverse direction (the direction of arrow W) outer sides of the circumferential direction main grooves 14 which are formed at the tire transverse direction sides, a plurality of blocks 18, which are defined by these circumferential direction main grooves 14 and a plurality of transverse direction grooves 16 extending along the tire transverse direction, are disposed along the circumferential direction of the tire.

A rib 20 extending along the circumferential direction of the tire is disposed on the equatorial plane CL of the tire at the tread 12. A plurality of blocks 24, which are defined by the circumferential direction main grooves 14 and grooves 22 inclined with respect to the tire transverse direction, are disposed at both sides of the rib 20 along the circumferential direction of the tire. A sipe 26 is formed in the tire circumferential direction center of the block 24.

A transverse groove 28 is formed in the tire circumferential direction center of the block 18 from the shoulder side toward the central portion of the block 18.

A sipe 32, which is substantially parallel to the trailing edge contour line of a ground-contact configuration 30, is formed at the region of the block 18 which is at the opposite side of the tire rotating direction side of the tire circumferential direction center of the block 18, i.e., the sipe 32 is formed at the trailing edge region of the block 18.

Further, a sipe 36, which is substantially parallel to the leading edge side contour line of the ground-contact configuration 30, is formed at the region of the block 18 at the tire rotating direction side of the tire circumferential direction center of the block 18, i.e., the sipe 36 is formed at the leading edge region of the block 18.

Next, operation of the pneumatic tire of the present first embodiment will be described.

Figure 2:
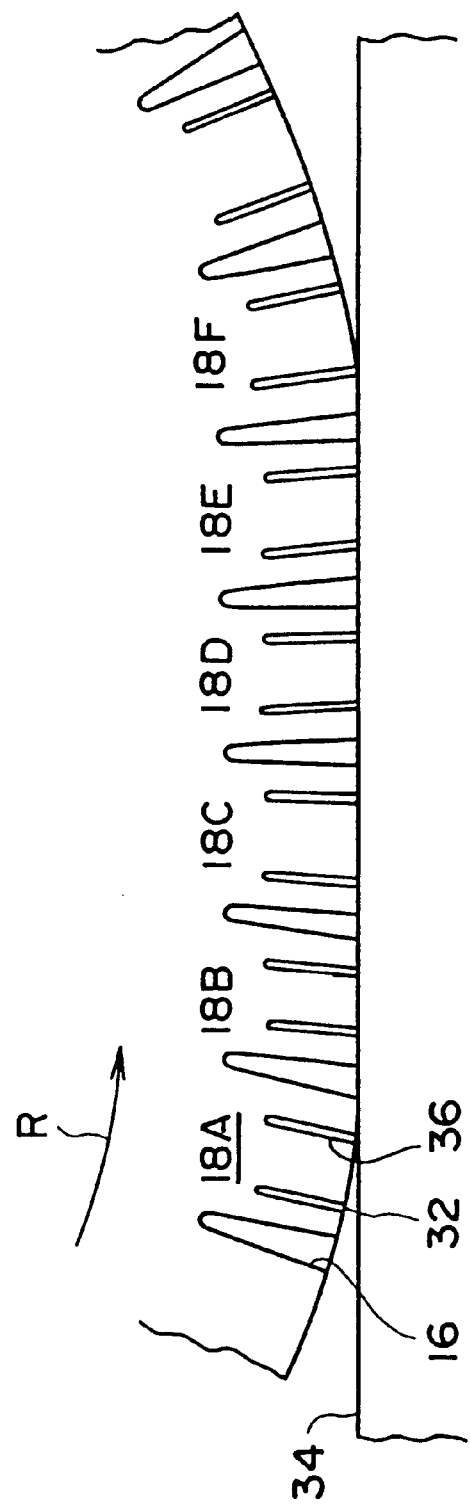
FIG. 2 is a cross-sectional view of a portion of the tread which contacts a road surface.

As illustrated in FIG. 2, envisaging the time when the pneumatic tire 10 rotates in the direction of arrow R on a road surface 34, for example, there is a block 18A at which only the leading edge end portion thereof contacts the road surface 34, blocks 18B-18E which entirely contact the road surface 34, and a block 18F which begins to move apart from the road surface 34 (i.e., only the trailing edge side end portion thereof contacts the road surface 34).

At the time of step-in, the block 18 is displaced toward the equatorial plane CL of the tire (see arrow A in FIG. 1), and thereafter contacts the road surface 34. At the time of kick-out, the block 18 returns while sliding toward the outer side, and shearing strain is generated in the block 18 between the region which returns first (the kicked-out region) and the region that is still contacting the road surface 34. However, the shearing strain which is about to be transmitted to the trailing edge is blocked by the sipe 32. Therefore, movement of the trailing edge with respect to the road surface 34 is suppressed, and wearing of the trailing edge (the toe side), i.e., heel-and-toe wear, is suppressed.

Because heel-and-toe wear is suppressed, the noise caused by heel-and-toe wear (the striking noise at the time of step-in of the block) can be decreased.

Further, because the compressive rigidity at the leading edge side of the block 18 is decreased due to the sipe 36, the striking noise at the time of step-in of the block is decreased even more.

Figure 3:
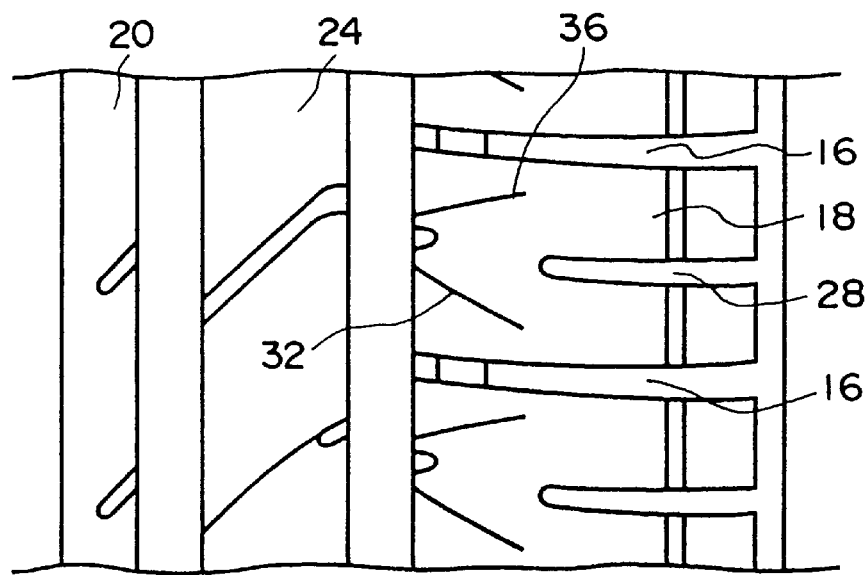
FIG. 3 is a plan view of a tread of a pneumatic tire relating to a modified example of the first embodiment of the present invention.
Figure 4:
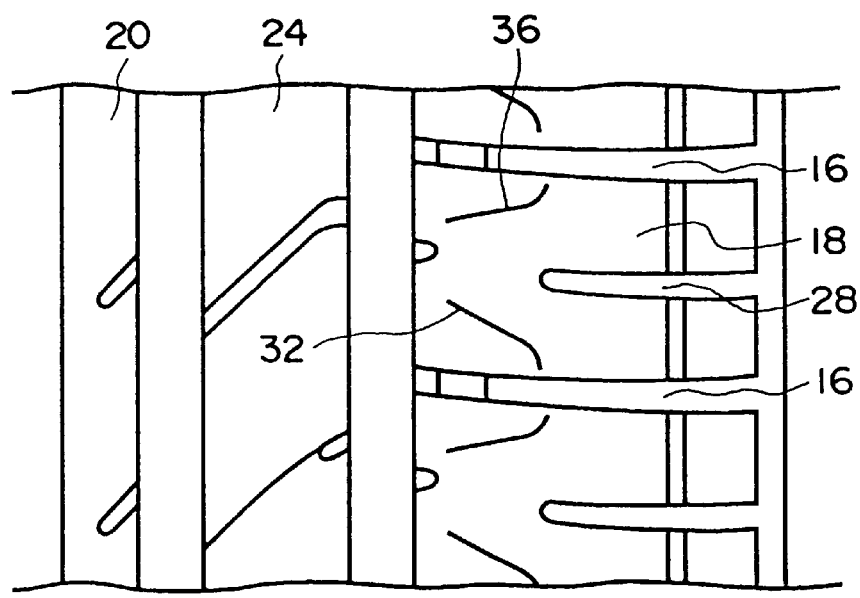
FIG. 4 is a plan view of a tread of a pneumatic tire relating to yet another modified example of the first embodiment of the present invention.

The sipes 32, 36 of the present first embodiment are linear, and the end portions thereof are not connected to the circumferential direction main grooves 14. However, the present invention is not limited to the same configuration. As illustrated in FIG. 3, end portions of the sipes 32, 26 may be connected to the circumferential direction main grooves 14. As illustrated in FIG. 4, portions of the sipes 32, 36 may be curved. Further, the entire sipes 32, 36 may be curved provided that they are substantially parallel to the contour line of the ground-contact configuration 30.

Moreover, in a case in which linear sipes such as the sipes 32, 36 are formed in the blocks, it is preferable that the sipes are parallel to tangent lines S (see FIG. 1) which are tangent to the contour line of the ground-contact configuration 30.

Second Embodiment

A second embodiment of a pneumatic tire of the present invention will be described hereinafter in accordance with FIG. 5.

Figure 5:
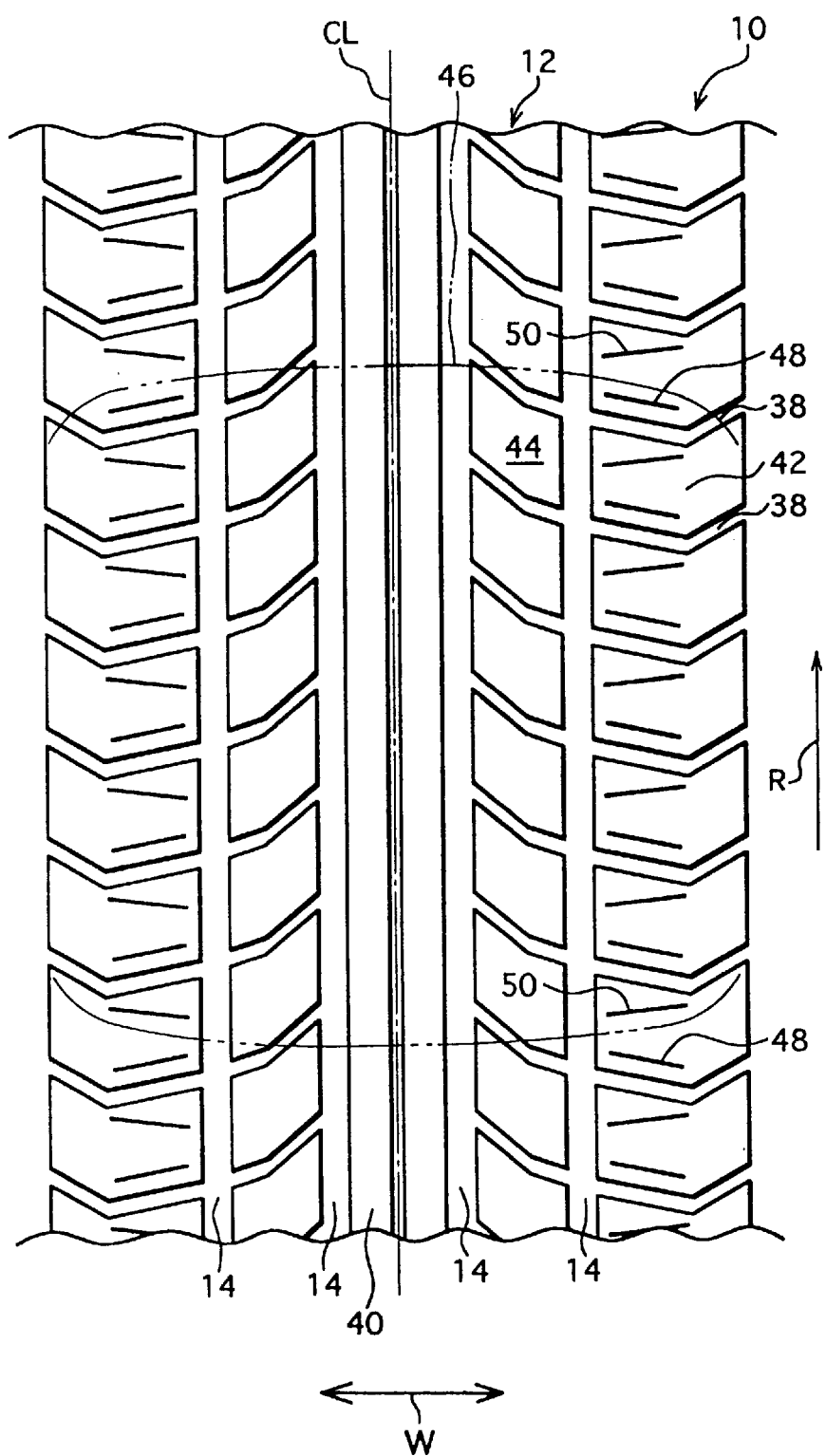
FIG. 5 is a plan view of a tread of a pneumatic tire relating to a second embodiment of the present invention.

As illustrated in FIG. 5, the four circumferential direction main grooves 14 extending along the tire circumferential direction are formed in the tread 12 of the pneumatic tire 10 of the present second embodiment. Inclined grooves 38, which extend from the transverse direction center of the tire toward the transverse direction outer sides of the tire, are formed along the circumferential direction of the tire.

A rib 40 is formed at the tire transverse direction center of the tread 12.

The inclined grooves 38 extend obliquely with respect to the tire transverse direction from the end portions of the rib 40 toward the direction opposite to the direction of arrow R (the rotating direction of the tire), and in vicinities of the shoulder portions, extend obliquely toward the direction of arrow R.

Shoulder blocks 42 defined by the inclined grooves 38 and the circumferential direction main grooves 14 are disposed along the tire circumferential direction at both shoulder portion sides (both tire transverse direction sides) of the tread 12. Second blocks 44, which are similarly defined by the circumferential direction main grooves 14 and the inclined grooves 38, are disposed between the shoulder blocks 42 and the rib 40 along the circumferential direction of the tire.

A sipe 48, which is substantially parallel to the contour line at the trailing edge of a ground-contact configuration 46, is formed in the trailing edge region of the shoulder block 42. A sipe 50, which is substantially parallel to the contour line at the leading edge of the ground-contact configuration 46, is formed in the leading edge region of the shoulder block 42.

In the present second embodiment as well, the shearing strain generated in the shoulder block 42 is blocked by the sipe 48. Therefore, heel-and-toe wear is suppressed, and noise caused by heel-and-toe wear can be reduced. Further, because the compressive rigidity at the leading edge side of the shoulder block 42 is decreased by the sipe 50, the striking noise at the time of step-in of the block is further decreased.

Figure 9:
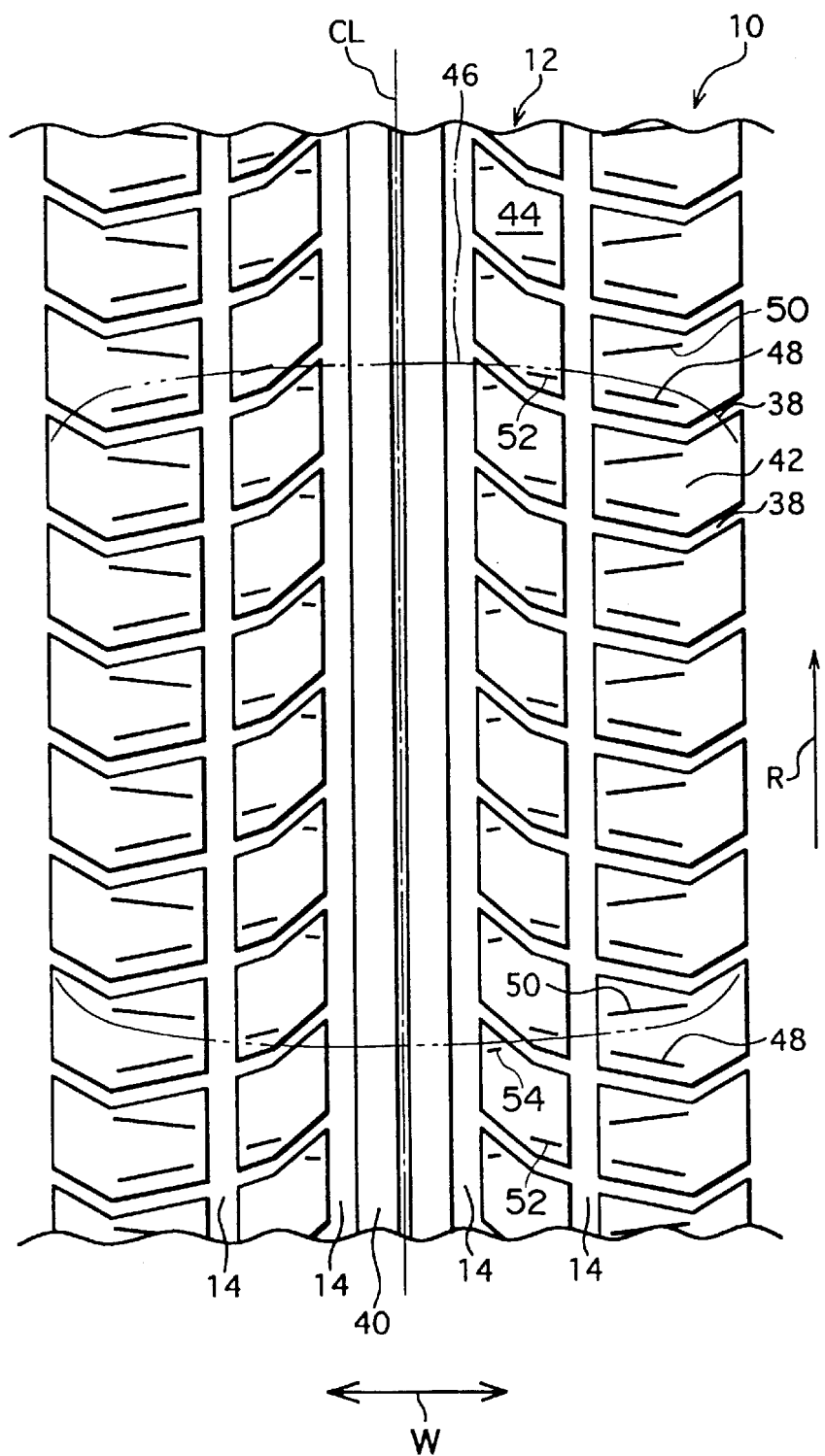
FIG. 9 is a plan view of a tread of a pneumatic tire relating to a modified example of the second embodiment of the present invention.

In the first embodiment, the sipes 32 and the sipes 36 are formed in the blocks 18 at the outermost sides in the tire transverse direction. In the second embodiment, the sipes 48 and the sipes 50 are formed in the shoulder blocks 42 at the outermost sides in the tire transverse direction. However, in a case in which there are plural rows of blocks along the tire transverse direction, for example, in the case of a pattern such as that illustrated in FIG. 9, sipes 52, which are substantially parallel to the contour line of the trailing edge of the ground-contact configuration 46, and sipes 54, which are substantially parallel to the contour line at the leading edge of the ground-contact configuration 46, may be formed in the second blocks 44 which are disposed at the tire transverse direction inner sides of the shoulder blocks 42.

Experimental Examples

In order to confirm the effects of the present invention, three types of Example Tires to which the present invention was applied, two types of Conventional Example Tires, and one type of Comparative Example Tire (all having a tire size of 225/50R16) were prepared, and wear and noise were compared at the same patterns in accordance with the following methods.

Figure 6:
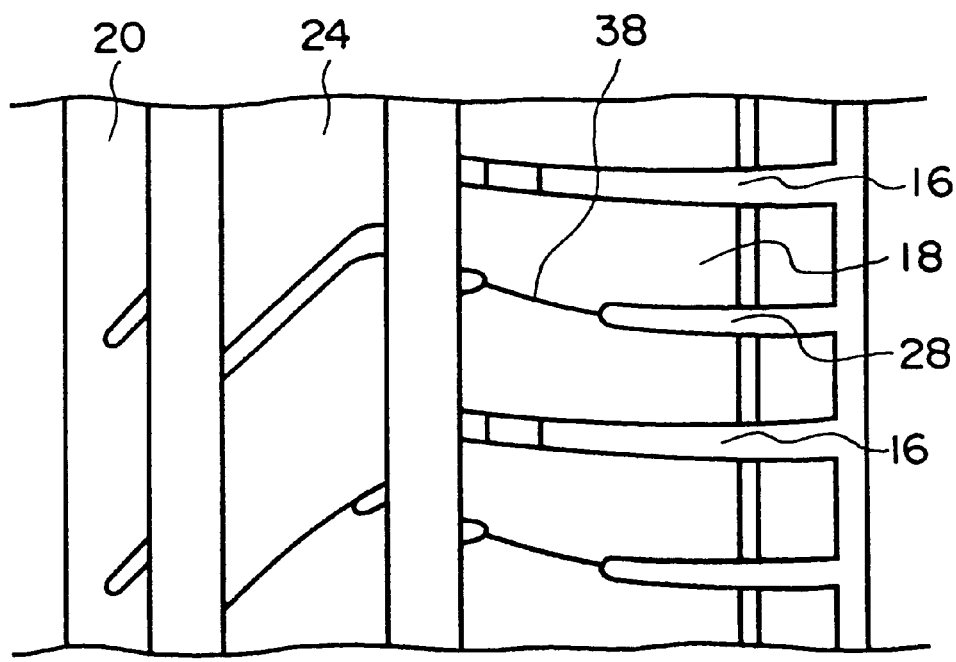
FIG. 6 is a plan view of a tread of Comparative Example Tire 1 used for testing.
Figure 7:
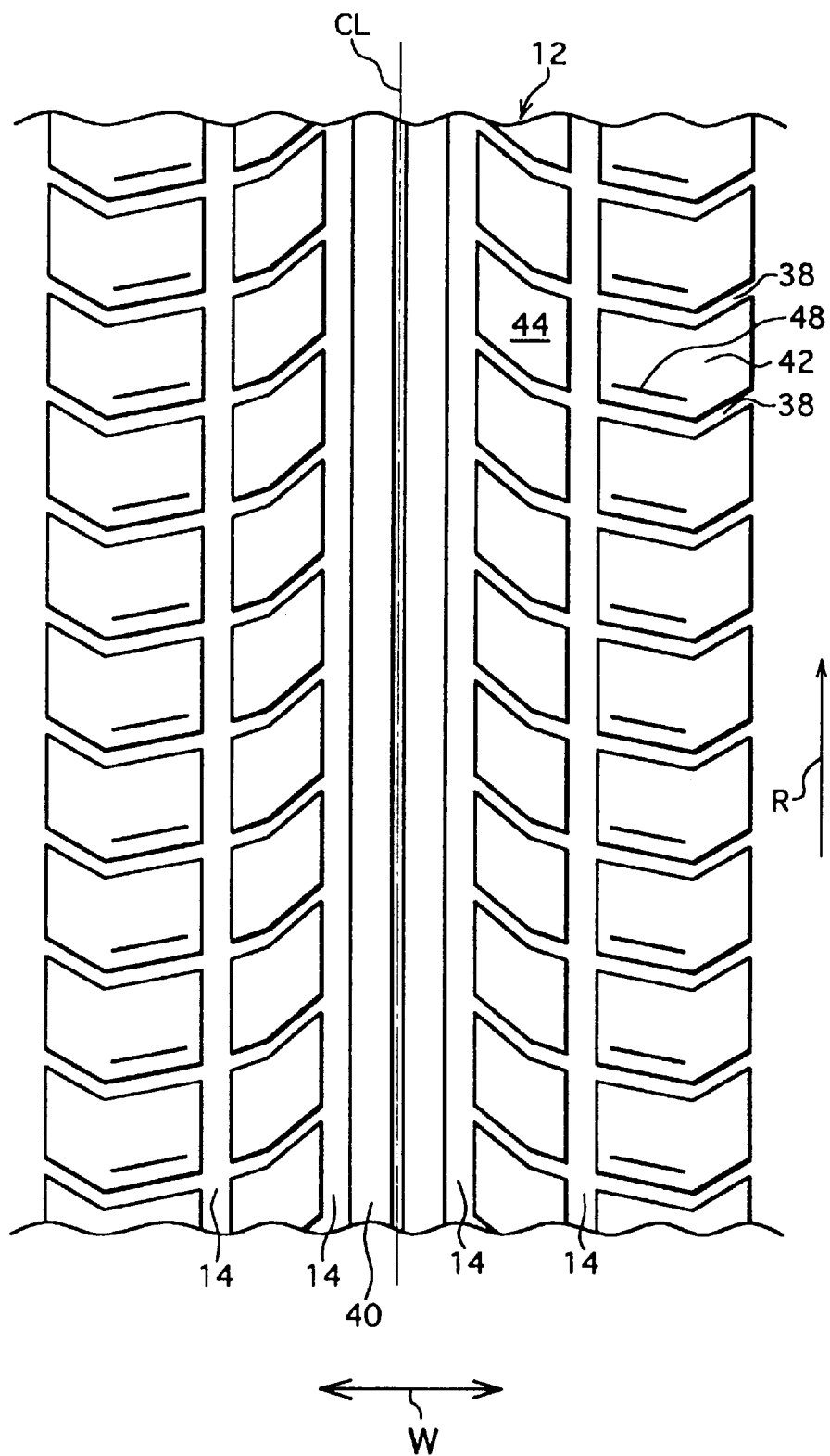
FIG. 7 is a plan view of Example Tire 2 used for testing.
Figure 8:
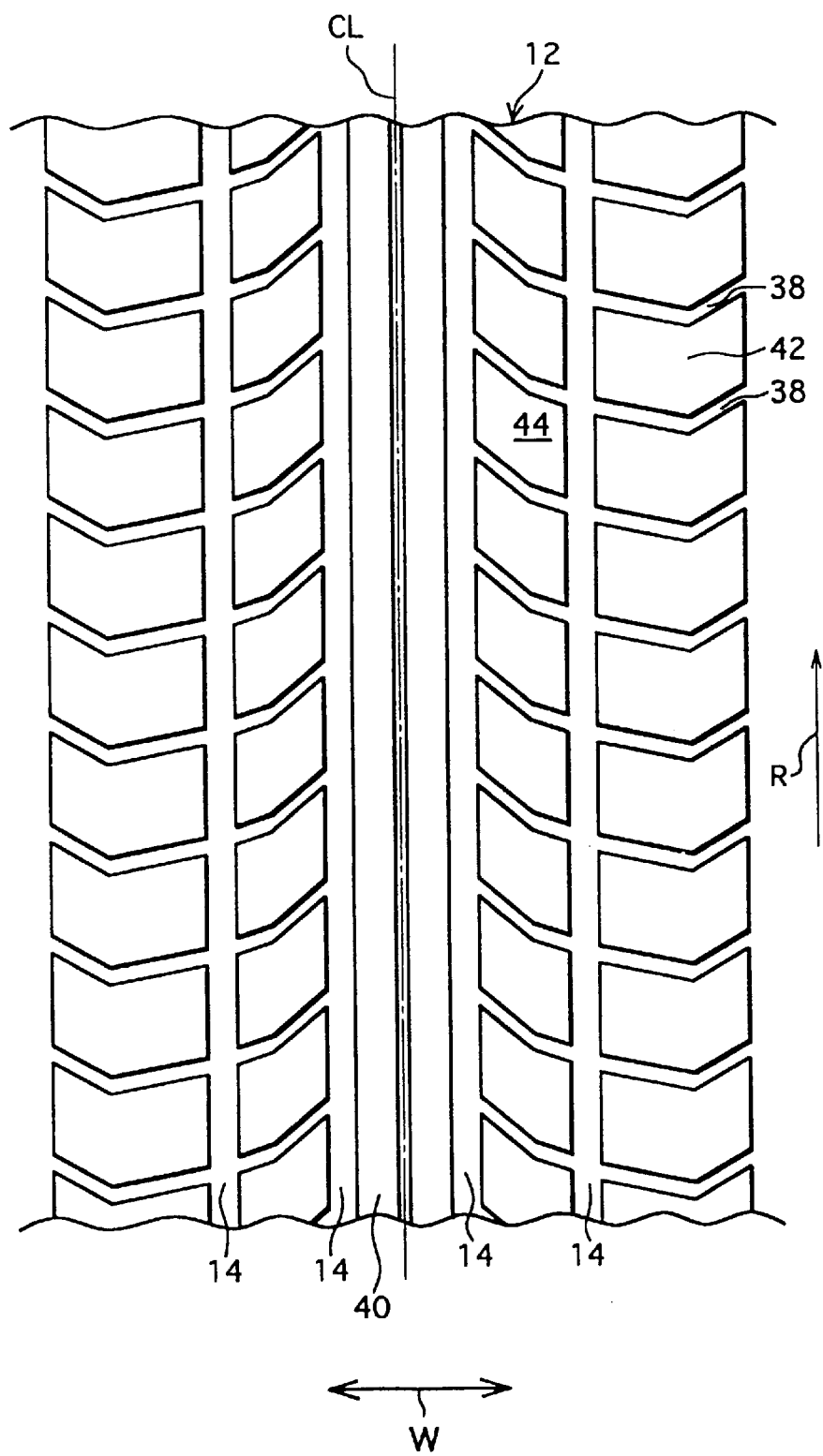
FIG. 8 is a plan view of a tread of Conventional Example Tire 2.

Example Tire 1:
 The tire of the first embodiment (see FIG. 1).
Conventional Example Tire 1:
 The same pattern as that of Example Tire 1, but sipes were not formed in any of the blocks.
Comparative Example Tire:
 The same pattern as that of Example Tire 1, but the sipes 38 were formed in the centers of the blocks 18 as shown in FIG. 6.
Example Tire 2:
 As shown in FIG. 7, the pattern was the same as that of Example Tire 3, but only the sipes 48 at the trailing edge regions were formed in the shoulder blocks 42.
Example Tire 3:
 The tire of the second embodiment (see FIG. 5).
Conventional Example Tire 2:
 As shown in FIG. 8, the pattern was the same as that of Example Tires 2, 3, but no sipes were formed in the blocks.

(Experimental Method)

The wear test was carried out by a flat belt wear testing machine at which the experimental tire was mounted to a 7.5 J rim and filled to an internal pressure of 2.0 kgf/cm$^2$. The experimental conditions were as follows.

road surface: Safety Walk type B (trade name, manufactured by 3M Co., Ltd.)
 slip angle: 0.5 degrees
 load braking force: 45 kgf
 running distance: 300 km
 room temperature: 30° C.
 load: 450 kgf
 speed: 50 km/h In the evaluation of the comparison, of the fires the difference in the amount of wear between the trailing edge and the leading edge of the block at the shoulder side was expressed as an index with the Conventional Example Tire being 100. Higher values indicate smaller wear differences which is better. The results are shown in following Tables 1 and 2.

The noise test was carried out by a drum testing machine at which the experimental tire was mounted to a 7.5 J rim and filled to an internal pressure of 2.0 kgf/cm$^2$. The experimental conditions were as follows.

road surface: Safety Walk type B (trade name, manufactured by 3M Co., Ltd.)
 slip angle: 0 degrees
 load braking force: free rolling
 room temperature: 30° C.
 load: 450 kgf
 speed: 40 km/h A noise meter was placed behind the tire at a distance of 50 cm from the tire leading edge. The noise level of the primary component of the pitch in the vicinity of 350 Hz of the worn tire after the above-described wear test was expressed as an index with the Conventional Example Tire being 100. Higher values indicate lower noise levels which is better. The results are shown in following Tables 1 and 2.

TABLE 1

|  | Amount of Step due to Wear (index) | Noise Level (index) |
| --- | --- | --- |
| Conventional Example Tire 1 | 100 | 100 |
| Example Tire 1 | 122 | 115 |
| Comparative Example Tire | 105 | 103 |

TABLE 2

|  | Amount of Step due to Wear (index) | Noise Level (index) |
| --- | --- | --- |
| Conventional Example Tire 2 | 100 | 100 |
| Example Tire 2 | 126 | 116 |
| Example Tire 3 | 129 | 122 |

It will be understood from the experimental results listed in Table 1, the Example Tire 1 to which the present invention is applied exhibits a great reduction in the amount of the step due to wear and the noise level as compared with Conventional Example Tire 1 and the Comparative Example Tire.

It will be understood from Table 2, the Example Tires 2 and 3 to which the present invention is applied exhibit greatly reduced amounts of steps due to wear and noise levels as compared to Conventional Example Tire 2. Further, Example Tire 3, which was provided with sipes at the leading edge regions of the blocks as well, results in an even greater decrease in the noise level than Example Tire 2.

The pneumatic tire of the present invention exhibits superior effects in that heel-and-toe wear is suppressed and noise is decreased.

Further, by providing sipes at the leading edge regions as well, an excellent effect is achieved in that noise can be decreased even more.

What is claimed is:

1. A pneumatic tire having a tread pattern including a plurality of blocks defined by a plurality of circumferential direction grooves extending substantially along a tire circumferential direction and a plurality of transverse direction grooves extending substantially along a tire transverse direction, wherein a sipe formed in a region at a trailing edge of each of blocks at shoulder sides of said pneumatic tire among the plurality of blocks, wherein both said sipe and a contour line at a trailing edge of a ground-contact configuration are inclined opposite a tire primary rotation direction as the sipe extends toward the axial direction outer-side of the tire, said sipe and said contour line are substantially parallel to each other at a same axial distance from an equatorial plane of the tire, a second sipe formed in a region at a leading edge of each of blocks at shoulder sides of said pneumatic tire among the plurality of blocks, both said second sipe and a contour line at a leading edge of a ground-contact configuration being inclined toward said tire primary rotation direction as the sipe extends toward the axial direction outer-side of the tire, and being substantially parallel to each other at a same axial distance from an equatorial plane of the tire.

2. A pneumatic tire according to claim 1, further comprising a third sipe, which is substantially parallel to the contour line at the leading edge of the ground-contact configuration and is inclined toward said tire primary rotational direction as the third sipe extends toward the axial direction outer-side of the tire, said third sipe being formed in a leading edge region of each of the blocks adjacent to and at transverse direction inner sides of the blocks at the shoulder sides of said pneumatic tire.

3. A pneumatic tire having a tread pattern including a plurality of blocks defined by a plurality of circumferential direction grooves extending substantially along a tire circumferential direction and a plurality of transverse direction grooves extending substantially along a tire transverse direction, wherein a sipe, which is inclined opposite a tire primary rotating direction as the sipe extends toward the axial direction outer-side of the tire, is formed in a trailing edge region of selected blocks of the plurality of blocks, and wherein said sipe is substantially parallel to a tangent line that is tangent to a contour line at a trailing edge at a ground-contact configuration at a same axial distance from an equitorial plane of the tire, a second sipe, which is inclined toward said tire primary direction as it extends toward the axial direction outer-side of the tire, is formed in a leading edge region of each of the selected blocks of the plurality of blocks, wherein said sipe being substantially parallel to a tangent line which is tangent to a contour line at a leading edge of a ground-contact configuration.

4. A pneumatic tire according to claim 3, further comprising a third sipe, which is inclined toward the tire rotating primaly direction as the sipe extends toward the axial direction outer-side of the tire, is formed in each of blocks which are adjacent to and at tire transverse direction inner sides of the blocks positioned at the shoulder sides of said pneumatic tire.

5. A pneumatic tire having a tread pattern including a plurality of blocks defined by a plurality of circumferential direction grooves extending substantially along a tire circumferential direction and a plurality of transverse direction grooves extending substantially along a tire transverse direction, wherein a first sipe, which is inclined with respect to a tire rotational axis such that a tire transverse direction inner side of said first sipe is disposed further toward a tire primary rotating direction side than a tire transverse direction outer side of said first sipe and which is substantially parallel to a contour line at a trailing edge of a ground-contact configuration at an axial location of said tire, is formed in a trailing edge region of each of selected blocks of the plurality of blocks; and a second sipe, which is inclined with respect to the tire rotational axis such that a tire transverse direction inner side of said second sipe is disposed further toward a side opposite said tire primary rotating direction than a tire transverse direction outer side of said second sipe and which is substantially parallel to a contour line at a leading edge of the ground-contact configuration at said axial location of said tire, is formed in a leading edge region of each of the selected blocks of the plurality of blocks.

6. A pneumatic tire having a tread pattern including a plurality of blocks defined by a plurality of circumferential direction grooves extending substantially along a tire circumferential direction and a plurality of transverse direction grooves extending substantially along a tire transverse direction, wherein a first sipe, which is inclined opposite the tire primary rotating direction as the sipe extends toward the axial direction outer-side of the tire, is formed in a trailing edge region of each of selected blocks of the plurality of blocks at an axial location of said tire; and a second sipe, which is separated from said first sipe and is inclined toward the tire primary direction as the second sipe extends toward the axial direction outer-side of the tire, is formed in a leading edge region of each of selected blocks of the plurality of blocks at said axial location of said tire, wherein said second sipe is substantially parallel to a contour line at a leading edge of a ground-contact configuration at a same distance from an equatorial plane of the tire.

* * * * *